(12) United States Patent
Ling et al.

(10) Patent No.: US 12,451,825 B2
(45) Date of Patent: Oct. 21, 2025

(54) CONTROL METHOD FOR ELECTRIC DRIVE SYSTEM OF VEHICLE, ELECTRIC DRIVE SYSTEM, AND VEHICLE

(71) Applicant: BYD COMPANY LIMITED, Guangdong (CN)

(72) Inventors: Heping Ling, Shenzhen (CN); Hua Pan, Shenzhen (CN); Yuxin Zhang, Shenzhen (CN); Guowei Qiu, Shenzhen (CN); Chen Hong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 195 days.

(21) Appl. No.: 18/215,725

(22) Filed: Jun. 28, 2023

(65) Prior Publication Data

US 2023/0344375 A1    Oct. 26, 2023

Related U.S. Application Data

(63) Continuation of application No. PCT/CN2021/124702, filed on Oct. 19, 2021.

(30) Foreign Application Priority Data

Mar. 31, 2021  (CN) .......................... 202110351040.0

(51) Int. Cl.
  *H02P 21/22* (2016.01)
  *B60H 1/00* (2006.01)
  (Continued)

(52) U.S. Cl.
  CPC ............. *H02P 21/22* (2016.02); *B60H 1/143* (2013.01); *H02P 21/14* (2013.01); *H02P 29/62* (2016.02);
  (Continued)

(58) Field of Classification Search
  CPC .......... B60L 58/26; B60L 50/51; B60L 50/60; B60L 2210/42; B60L 15/20; B60L 58/27;
  (Continued)

(56) References Cited

U.S. PATENT DOCUMENTS

2021/0313924 A1* 10/2021 Yoo ..................... H02M 1/0009
2023/0036883 A1*  2/2023 Nita ....................... H02K 11/25
2024/0001777 A1*  1/2024 Li ........................... B60L 58/25

FOREIGN PATENT DOCUMENTS

CN    110126678 A    8/2019
CN    110995099 A    4/2020
(Continued)

OTHER PUBLICATIONS

International Search Report and Written Opinion for Application No. PCT/CN2021/124702, mailed on Jan. 21, 2022, 10 pages.

*Primary Examiner* — Bickey Dhakal
(74) *Attorney, Agent, or Firm* — Sheppard Mullin Richter & Hampton LLP

(57) ABSTRACT

A control method for an electric drive system of a vehicle, includes: acquiring a shaft torque of the electric motor and a present operating point of the vehicle in response to a vehicle heating demand signal; acquiring a present heat generation power of the electric drive system accordingly; determining a current adjustment amplitude accordingly; acquiring a three-phase current value and a position value of the electric motor, and a present direct axis current value and a present quadrature axis current value of the electric motor at the present operating point accordingly; controlling the present direct axis current value to oscillate at a change frequency and the current adjustment amplitude to obtain a target direct axis current value; acquiring a target quadrature axis current value accordingly; acquiring an electric motor drive signal accordingly.

17 Claims, 6 Drawing Sheets

(51) Int. Cl.
*B60H 1/14* (2006.01)
*B60L 15/20* (2006.01)
*B60L 58/27* (2019.01)
*H02P 21/14* (2016.01)
*H02P 29/62* (2016.01)

(52) U.S. Cl.
CPC ........... *B60H 1/00385* (2013.01); *B60L 15/20* (2013.01); *B60L 58/27* (2019.02); *B60L 2240/423* (2013.01); *B60L 2240/425* (2013.01); *B60L 2240/427* (2013.01); *B60L 2240/429* (2013.01)

(58) Field of Classification Search
CPC ......... B60L 2240/423; B60L 2240/429; B60L 2240/425; B60L 2240/427; B60L 2240/34; B60L 15/025; B60L 15/06; B60L 15/2045; B60L 2220/14; H02P 23/00; H02P 25/022; H02P 27/06; H02P 21/22; H02P 21/14; H02P 29/62; H02P 29/60; B60H 1/04; B60H 1/143; B60H 1/00385; B60H 1/3208; B60H 1/00428; B60K 1/00; B60K 11/02; B60K 11/04; B60K 2001/006; B60K 2001/008; Y02T 10/72; Y02T 10/64; B60Y 2200/91; B60Y 2306/07

See application file for complete search history.

(56) References Cited

FOREIGN PATENT DOCUMENTS

| | | |
|---|---|---|
| CN | 111347928 A | 6/2020 |
| CN | 111347935 A | 6/2020 |
| CN | 111347938 A | 6/2020 |
| CN | 111354999 A | 6/2020 |
| CN | 111865183 A | 10/2020 |
| CN | 111865184 A | 10/2020 |
| CN | 111865185 A | 10/2020 |
| CN | 112297771 A | 2/2021 |
| CN | 112550077 A | 3/2021 |
| CN | 113022262 A | 6/2021 |
| CN | 113022326 A | 6/2021 |
| EP | 2665179 A1 | 11/2013 |
| JP | 2012165526 A | 8/2012 |
| JP | 2012186917 A | 9/2012 |
| JP | 2013038925 A | 2/2013 |
| JP | 2014212602 A | 11/2014 |
| WO | 2020125769 A1 | 6/2020 |

* cited by examiner

CONTROL METHOD FOR ELECTRIC DRIVE SYSTEM OF VEHICLE, ELECTRIC DRIVE SYSTEM, AND VEHICLE

CROSS-REFERENCE TO RELATED APPLICATIONS

This application is a Continuation Application of International Patent Application No. PCT/CN2021/124702, filed on Oct. 19, 2021, which is based on and claims priority to and benefits of Chinese Patent Application No. 202110351040.0, filed on Mar. 31, 2021. The entire content of all of the above-referenced applications is incorporated herein by reference.

FIELD

The present disclosure relates to the technical field of vehicles, and specifically, to a control method for an electric drive system of a vehicle, an electric drive system, and a vehicle.

BACKGROUND

In cold areas or cold working conditions, the charging and discharging capacity of power batteries for new energy vehicles is limited due to the influence of low temperature, which affects the whole-body performance.

Therefore, in the related art, a method for improving the heating effect using electric motor waste heat is proposed. A battery cooler and electric motor waste heat are used in the technology to improve the heating performance of a heat pump and defrost an external condenser. However, in this technology, the amount of electric motor waste heat is not controllable, and the effectiveness of motor heat utilization is poor when the ambient temperature is very low.

In a vehicle and a power battery heating device and method of the related art, when a power battery needs to be heated, a three-phase AC motor is controlled to generate heat to heat a coolant flowing through the power battery. In the heating process, the phase current of the three-phase AC motor is adjusted according to a preset direct axis current and a preset quadrature axis current, such that the motor shaft output cannot move the vehicle, and the motor output shaft is only caused to output a pre-tightening force to a transmission mechanism to cancel the meshing clearance and prevent the jitter of the vehicle. Although this technology can control the heat generated by an electric drive system, it can only be used when the vehicle is stationary, so the applications are limited.

SUMMARY

The present disclosure provides a control method for an electric drive system of a vehicle, an electric drive system and a vehicle. The heat generation rates of the electric drive system and the power battery itself are accelerated by adjusting a direct axis current value and a quadrature axis current value of an electric motor, so that the heat can be applicable to the thermal management of the vehicle, and the electric drive system of the vehicle is suitable for use in cold areas.

In a first aspect, the present disclosure provides a control method for an electric drive system of a vehicle. The electric drive system includes an electric motor and an electric motor controller. The method includes:

acquiring a shaft torque of the electric motor and a present operating point of the vehicle in response to a vehicle heating demand signal;

acquiring a present heat generation power of the electric drive system according to the present operating point of the vehicle;

determining a current adjustment amplitude according to a vehicle heating power demand and the present heat generation power;

acquiring a three-phase current value and a position value of the electric motor, and acquiring a present direct axis current value and a present quadrature axis current value of the electric motor at the present operating point of the vehicle according to the three-phase current value and the position value;

controlling the present direct axis current value to oscillate at a change frequency and the current adjustment amplitude to obtain a target direct axis current value;

acquiring a target quadrature axis current value according to the target direct axis current value and the shaft torque of the electric motor;

acquiring an electric motor drive signal according to the target direct axis current value, the target quadrature axis current value, the present direct axis current value, and the present quadrature axis current value; and sending the electric motor drive signal to the electric motor controller, to control an operation of the electric motor.

In the control method for an electric drive system of a vehicle according to the embodiment of the present disclosure, the target quadrature axis current value is acquired according to the target direct axis current value and the shaft torque of the electric motor, and the shaft torque of the electric motor of the vehicle is ensured to be unchanged when the vehicle travels, so as to avoid the discomfort caused by jitter of the vehicle. The target direct axis current value is controlled to oscillate at a preset change frequency and the current adjustment amplitude, which makes the electric drive system heat up. Moreover, the current flowing through the power battery itself oscillates to accelerate the heat generation rate of the power battery itself. Accordingly, the electric drive system of the vehicle is suitable for use in cold areas, and the heat generated by the power battery itself and the heat of the electric drive system are also applicable to the thermal management of the vehicle. Moreover, the control method for an electric drive system of a vehicle only requires the improvement of the software with no need to change the hardware architecture, has low cost, and is easy to be popularized.

In a second aspect, the present disclosure provides an electric drive system, which includes: an electric motor and an electric motor controller; a current sensor, configured to collect a three-phase current value of the electric motor; a position sensor, configured to collect a position value of the electric motor; a processor, connected to the electric motor controller, the current sensor, and the position sensor, and configured to implement the control method for an electric drive system of a vehicle in any of the foregoing embodiments.

In the electric drive system according to the embodiment of the present disclosure, generic hardware of the electric drive system can be used, and the control method for an electric drive system of a vehicle in any of the foregoing embodiments is implemented by the processor. The target direct axis current value is controlled to oscillate at a preset change frequency and a current adjustment amplitude, to makes the electric drive system heat up. Moreover, the current flowing through the power battery itself oscillates to accelerate the heat generation rate of the power battery itself. Accordingly, the electric drive system of the vehicle is suitable for use in cold areas, and the heat generated by the power battery itself and the heat of the electric drive system are also applicable to thermal management of the vehicle. Moreover, the control method for an electric drive system of a vehicle only requires the improvement of the software with no need to change the hardware architecture, has low cost, and is easy to be popularized.

In a third aspect, the present disclosure provides a vehicle, which includes: a heating demand system and a vehicle controller, where the vehicle controller is configured to send a vehicle heating demand signal when the heating demand system is determined to have a heating demand; and an electric drive system according to the foregoing embodiment, where the electric drive system is connected to the vehicle controller, and forms a heat conducting loop with the heating demand system.

In the vehicle according to the embodiment of the present disclosure, the heat conducting loop conducts modules of the vehicle that may require heat, for example, power battery. When a heat generation demand makes for the electric drive system, the vehicle controller receives a heating demand signal. By the control method for an electric drive system of a vehicle in any of the foregoing embodiments, the quadrature and direct axis current values are controlled to oscillate at a current adjustment amplitude and a preset change frequency, and the electric motor controller controls the electric motor to operate. Therefore, the electric drive system can be adjusted to generate heat dynamically at any operating point of the vehicle, to quickly raise the temperature of the power battery of the vehicle and other vehicle components.

Other aspects and advantages of the present disclosure will be given in the following description, some of which will become apparent from the following description or may be learned from practices of the present disclosure.

BRIEF DESCRIPTION OF THE DRAWINGS

The above and/or other additional aspects and advantages of the present disclosure will become apparent and comprehensible from the description of embodiments in connection with accompanying drawings, in which.

LIST OF REFERENCE NUMERALS

01: vehicle;
20: heating demand system, 30: vehicle controller, 10: electric drive system;
1: electric motor, 2: electric motor controller, 3: current sensor, 4: position sensor, and 5: processor.

DETAILED DESCRIPTION

The embodiments of the present disclosure will be described in detail below, and the embodiments described with reference to accompanying drawings are exemplary.

A control method for an electric drive system of a vehicle according to an embodiment of the present disclosure will be described below with reference to FIG. 1 to FIG. 6.

Figure 1:
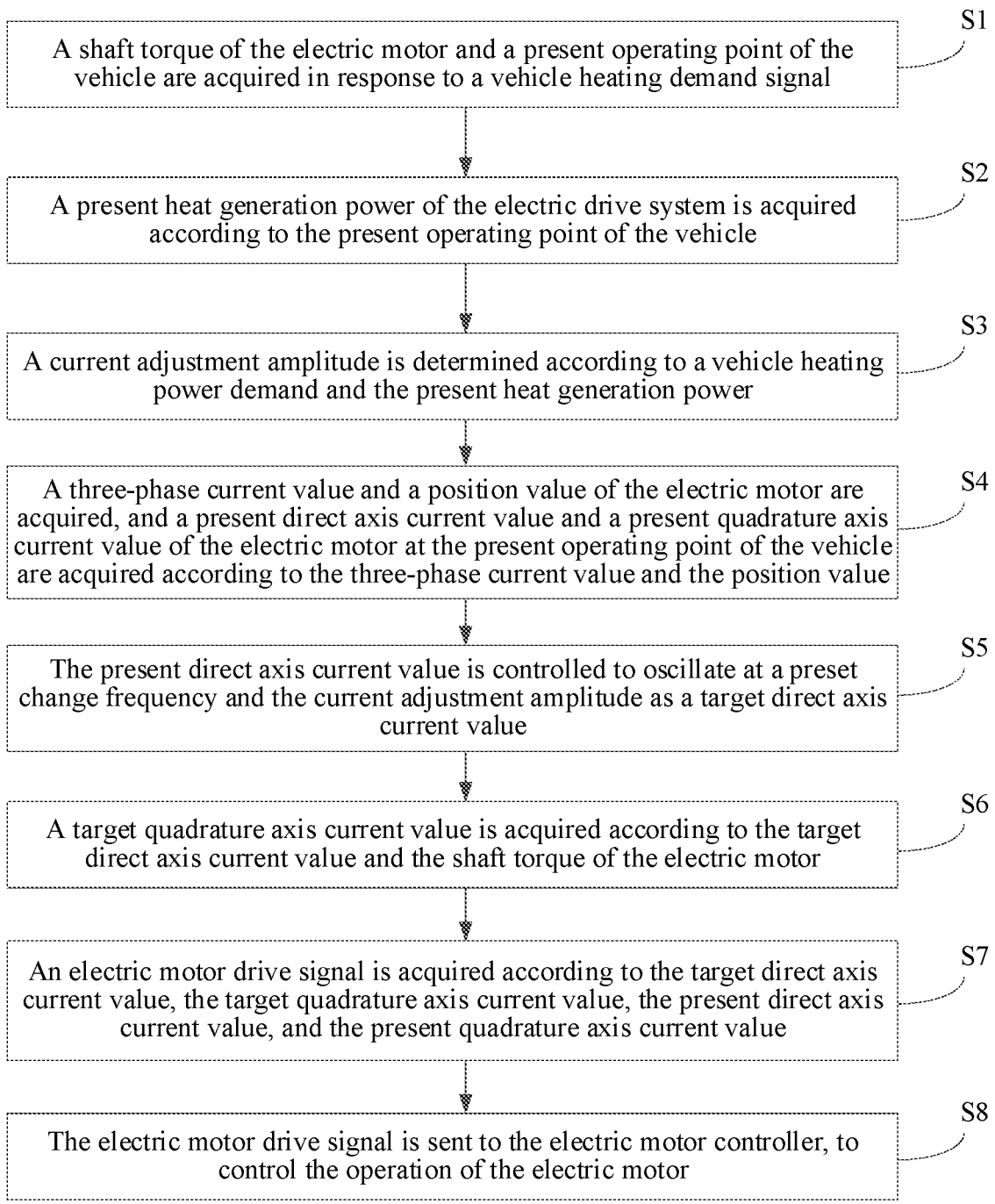
FIG. 1 is a flow chart of a control method for an electric drive system of a vehicle according to an embodiment of the present disclosure.

FIG. 1 is a flow chart of a control method for an electric drive system of a vehicle according to an embodiment of the present disclosure.

In some embodiments of the present disclosure, the electric drive system includes an electric motor and an electric motor controller. The electric motor controller is configured to control the operating state of the electric motor. For example, the electric motor controller can control a power switching device to be on or off according to an electric motor drive signal, or adjusting the operating power of the electric motor to operate at a particular power, so as to meet the heating adjustment demand of the electric drive system.

As shown in FIG. 1, the control method for an electric drive system of a vehicle includes at least Steps S1-S8 which are specifically:

S1: A shaft torque of the electric motor and a present operating point of the vehicle are acquired in response to a vehicle heating demand signal.

In some embodiments of the present disclosure, for example, in cold areas or in cold working conditions, the charging and discharging capacity of power batteries for vehicles is limited due to the influence of low temperature, and the power battery in the vehicle needs to be heated. The vehicle sends a vehicle heating demand signal to the electric drive system. And for example, when the vehicle operates, other modules in the vehicle require heat, it is determined that there is a need to enter the heating adjustment function of the electric drive system. For example, when a heating operation of the air conditioning system by the user is determined, or instructions are received to heat the vehicle passenger compartment, for example, the seats, the vehicle sends a vehicle heating demand signal to the electric drive system.

In response to the vehicle heating demand signal, the electric drive system detects a shaft torque of the electric motor and determines a present operating point of the vehicle. For example, when the vehicle travels, the shaft torque of the electric motor is ensured to be unchanged. By detecting the shaft torque of the electric motor, a present operating point with the optimal energy consumption when the vehicle operates at the shaft torque of the electric motor is determined.

S2: A present heat generation power of the electric drive system is acquired according to the present operating point of the vehicle.

A present operating power of the electric motor can be detected, and the present heat generation power of the electric drive system is acquired according to the present operating power of the electric motor.

S3: A current adjustment amplitude is determined according to a vehicle heating power demand and the present heat generation power.

In an embodiment, the vehicle controller can determine a vehicle heating power demand by comprehensively considering the heating demands of various heating demand systems in the vehicle, for example, the power battery, the passenger compartment, and other components, and sends the vehicle heating power demand to the electric drive system. The heating power of the electric drive system is related to the operating current of the electric motor, and a different heating power can be generated by adjusting the operating current of the electric motor.

In some embodiments, when the present heat generation power of the electric drive system cannot meet the vehicle heating power demand, the operating current of the electric motor needs to be adjusted. The electric drive system determines a current adjustment amplitude for adjusting the operating current of the electric motor according to the vehicle heating power demand and the present heat generation power. In an embodiment, a power difference between the vehicle heating power demand and the present heat generation power is calculated, and the current adjustment amplitude is acquired according to the power difference. The present heat generation power can be obtained by looking up a table that shows the relationship between the rotational speed of the electric motor, the magnitude of a composite current vector, and the present heat generation power. The magnitude of a composite current vector is a composite current value of a present direct axis current value and a present quadrature axis current value, and the table can be obtained by calibration on a bench in advance. The table is written in the electric motor controller. As such, the present heat generation power can be obtained according to the present direct axis current value, the present quadrature axis current value, and the rotational speed of the electric motor, with no need to calculate the heat generated by each component, thus reducing the calculation time.

The larger the power difference is, the greater the current adjustment amplitude will be; or the smaller the power difference is, the smaller the current adjustment amplitude will be.

The current adjustment amplitude or the preset change frequency at different operating points of the vehicle may be different, and the preset change frequency or the current adjustment amplitude can be adjusted to adapt to the vehicle heating demand.

S4: A three-phase current value and a position value of the electric motor are acquired, and a present direct axis current value and a present quadrature axis current value of the electric motor at the present operating point of the vehicle are acquired according to the three-phase current value and the position value.

In some embodiments of the present disclosure, the position value of the electric motor, such as the real-time rotor position and rotational speed of the electric motor, is acquired by a position sensor; and a three-phase current value of the electric motor is acquired by a current sensor between the electric motor and the electric motor controller, where the acquired three-phase current value is a three-phase static current value.

The present direct axis current value and the present quadrature axis current value of the electric motor can be acquired by coordinate transformation. For example, the three-phase current value can be transformed into a two-phase rotatory current value by coordinate transformation. The two-phase rotatory current value includes the present quadrature axis current value and the present direct axis current value.

S5: The present direct axis current value is controlled to oscillate at a preset change frequency and the current adjustment amplitude as a target direct axis current value.

The step of controlling the present direct axis current value to oscillate at a preset change frequency and the current adjustment amplitude to obtain a target direct axis current value include: acquiring a first direct axis current value and a second direct axis current value according to the current adjustment amplitude, and the target direct axis current value changing periodically at a preset change frequency with the present direct axis current value as a reference value, the first direct axis current value as a peak, and the second direct axis current value as a valley. The first direct axis current value is a sum of the present direct axis current value and the current adjustment amplitude, and the second direct axis current value is a difference of the present direct axis current value and the current adjustment amplitude.

Taking a sinusoidal wave as an example, the target direct axis current value is an effective value having the present direct axis current value as a reference value, the first direct axis current value as a peak, and the second direct axis current value as a valley. That is, the target direct axis current value is an effective value that oscillates with the present direct axis current value as a reference value at a preset change frequency and the current adjustment amplitude.

Figure 2:
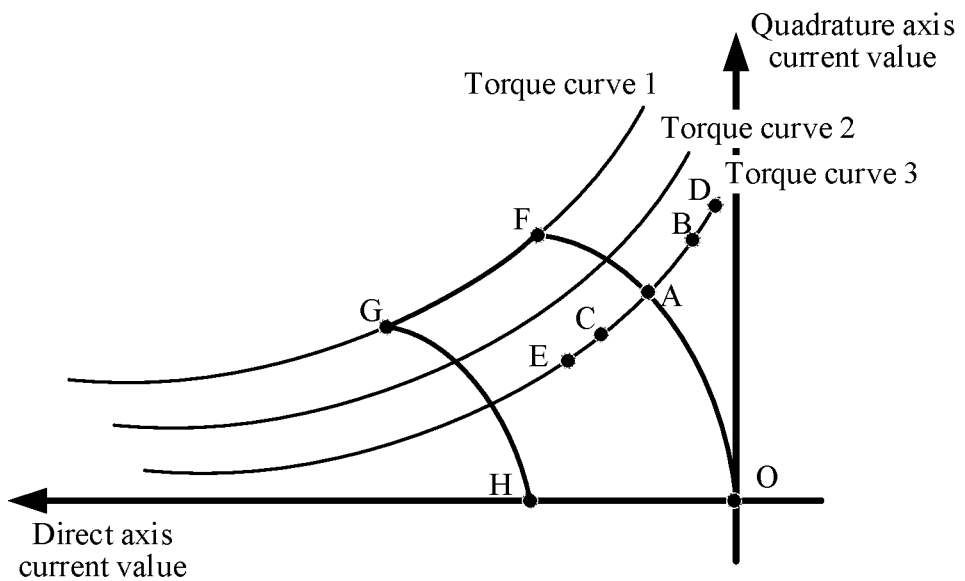
FIG. 2 is a schematic diagram showing the trajectory of a combination of quadrature and direct axis currents according to an embodiment of the present disclosure.

In an embodiment, FIG. 2 is a schematic diagram showing the trajectory of a combination of quadrature and direct axis currents according to an embodiment of the present disclosure. In the figure, the horizontal axis is the direct axis current value, the vertical axis is the quadrature axis current value, and all three curves are constant-torque curves. That is, the combination of quadrature and direct axis currents at any point of the same curve can output the same shaft torque of the electric motor, and different torque curves represent different shaft torques of the electric motor. The value decreases with the torque curve approaching the zero point, and increases with the torque curve shifting going away from the zero point. That is, the shaft torque of the electric motor corresponding to torque curve 1 is greater than the shaft torque of the electric motor corresponding to torque curve 2, which is greater than the shaft torque of the electric motor corresponding to torque curve 3. Points A, B, C, D, and E on torque curve 3 are operating points of the vehicle at the same shaft torque of the electric motor, the OF curve is a maximum torque per ampere (MTPA) curve, and the GH curve is a maximum torque per voltage (MTPV) curve. The combined MTPA and MTPV curves are calibrated under multiple boundary conditions, and the specific calibration method is not described in detail. In the related art, the direct axis current value is controlled and adjusted in an area defined by OFGH, so the scope of adjustment is limited.

In some embodiments of the present disclosure, the vehicle determines that there is a need to enter the heat generation adjustment function of the electric drive system according to the vehicle heating demand. When the vehicle operates at operating point A, the direct axis current value at operating point A is determined as the present direct axis current value. For example, the acquired current adjustment amplitude is Δd and the preset change frequency is f Operating point A is determined to be located on torque curve 3. The operating point is slid left and right with the current adjustment amplitude Δd along torque curve 3 where operating point A is located. The operating point is slid right from operating point A to the top operating point B, and the direct axis current value at operating point B is determined to be the first direct axis current value. The operating point is slid left from operating point A to the bottom operating point C, and the direct axis current value at operating point C is determined to be the second direct axis current value. In FIG. 2, the trajectory of the combination of quadrature and direct axis currents is the trajectory A→B→A→C→A on torque curve 3. The target quadrature and direct axis current values are periodically adjusted. With the time of current adjustment, the direct axis current value will present a periodically oscillating waveform, such as a sinusoidal waveform, a square waveform or other suitable waveforms, where the amplitude of the waveform depends on the current adjustment amplitude.

Figure 3:
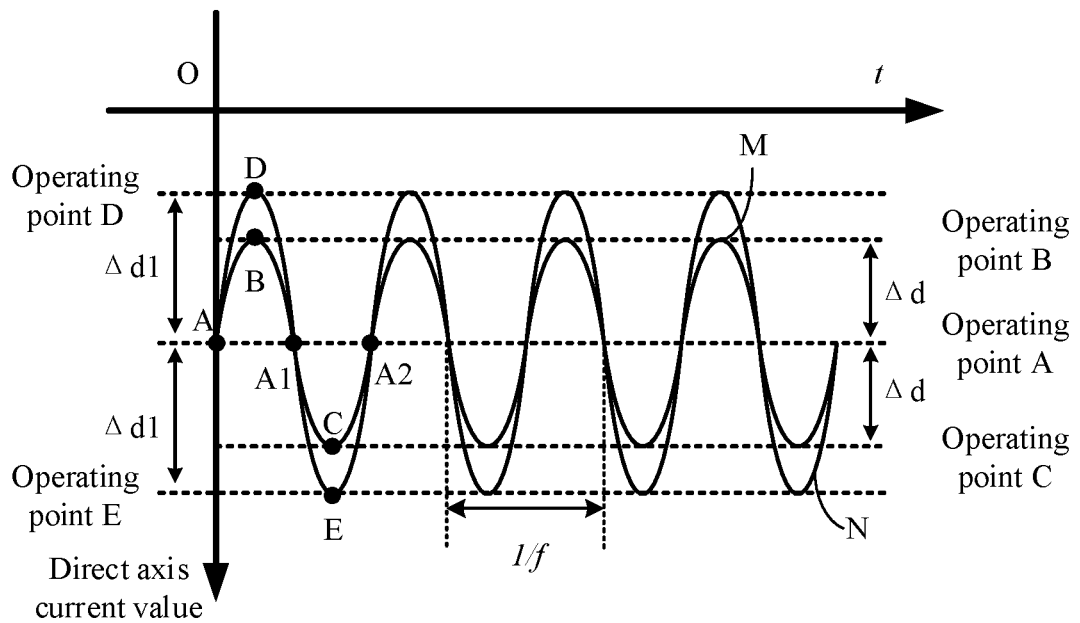
FIG. 3 is a schematic diagram showing a periodically oscillating direct axis current value according to an embodiment of the present disclosure.

FIG. 3 is a schematic diagram showing a periodically oscillating direct axis current value according to an embodiment of the present disclosure. In the figure, the vertical axis is the direct axis current value, and the five dotted lines respectively corresponds to the target direct axis current values at operating points A, B, C, D, E in FIG. 2. Sinusoidal curve 1 is a direct axis current oscillating curve M, where the preset change frequency in the direct axis current oscillating curve M is f, in Hz; and the current adjustment amplitude is Δd, in A. Sinusoidal curve 2 is a direct axis current oscillating curve N, where the preset change frequency in the direct axis current oscillating curve N is f, in Hz, and the current adjustment amplitude is Δd1, in A. The current adjustment amplitude Δd is a target direct axis current difference from operating point A to operating point B, or from operating point A to operating point C, and the target direct axis current difference from operating point A to operating point B is the same as the target direct axis current difference from operating point A to operating point C. The current adjustment amplitude Δd1 is a target direct axis current difference from operating point A to operating point D, or from operating point A to operating point E, and the target direct axis current difference from operating point A to operating point D is the same as the target direct axis current difference from operating point A to operating point E.

In some embodiments of the present disclosure, the vehicle determines that there is a need to enter the heat generation adjustment function of the electric drive system according to the vehicle heating demand. When the vehicle operates at operating point A, the direct axis current value at operating point A is determined as the present direct axis current value. For example, the acquired current adjustment amplitude is Δd and the preset change frequency is f Operating point A is determined to be located on torque curve 3. The operating point is slid left and right with the current adjustment amplitude Δd along torque curve 3 where operating point A is located. The operating point is slid right from operating point A to the top operating point B, and the direct axis current value at operating point B is determined to be the first direct axis current value. The operating point is slid left from operating point A to the bottom operating point C, and the direct axis current value at operating point C is determined to be the second direct axis current value. In FIG. 2, the trajectory of the combination of quadrature and direct axis currents is the trajectory A→B→A→C→A on torque curve 3. Correspondingly, in FIG. 3, the target direct axis current value varies on the direct axis current oscillating curve M, and the oscillating trajectory of the target direct axis current value runs along the direct axis current oscillating curve M.

As shown in FIG. 2 and FIG. 3, particularly in FIG. 2, the operating point is shifted along torque curve 3 from operating point A to operating point B in a direction with increasing target direct axis current value and increasing target quadrature axis current value. Simultaneously, the target direct axis current value in FIG. 3 is shifted from point A to point B along the direct axis current oscillating curve M. In this case, the target direct axis current value increases, and the target quadrature axis current value increases correspondingly. The operating point is shifted continuously, along torque curve 3 from operating point B back to operating point A in a direction with decreasing target direct axis current value and decreasing target quadrature axis current value, as shown in FIG. 2. Simultaneously, the target direct axis current value in FIG. 3 is shifted from point B to point A1 along the direct axis current oscillating curve M. In this case, the target direct axis current value decreases, and the target quadrature axis current value decreases correspondingly. The operating point is shifted continuously, along torque curve 3 from operating point A to operating point C in a direction with decreasing target direct axis current value and decreasing target quadrature axis current value, as shown in FIG. 2. Simultaneously, the direct axis current value in FIG. 3 is shifted from point A1 to point C along the direct axis current oscillating curve M. In this case, the target direct axis current value decreases, and the target quadrature axis current value decreases correspondingly. The operating point is shifted continuously, from operating point C back to operating point A along torque curve 3 in a direction with increasing target direct axis current value and increasing target quadrature axis current value, as shown in FIG. 2. Simultaneously, the target direct axis current value in FIG. 3 is shifted from point C to point A2 along the direct axis current oscillating curve M. In this case, the target direct axis current value increases, and the target quadrature axis current value increases correspondingly. As such, one oscillation period of the target direct axis current value at operating point A is completed. If the vehicle continues to operate at operating point A shown in FIG. 2, the above steps are repeated.

S6: A target quadrature axis current value is acquired according to the target direct axis current value and the shaft torque of the electric motor.

In some embodiments of the present disclosure, when the vehicle travels under the same conditions, the shaft torque of the electric motor is unchanged. When it is determined that there is a need to enter the heat generation adjustment function of the electric drive system, the target direct axis current value is needed to be adjusted, and the target quadrature axis current value will change accordingly. To ensure the normal driving of the vehicle, the target quadrature axis current value corresponding to the target direct axis current value needs to be adjusted. For example, the target quadrature axis current value can be defined by a fixed algorithm, and directly calculated according to the target direct axis current value, with no need to look it up in a table, so the process is simple.

S7: An electric motor drive signal is acquired according to the target direct axis current value, the target quadrature axis current value, the present direct axis current value, and the present quadrature axis current value. The target direct axis current value, the target quadrature axis current value, the present direct axis current value, and the present quadrature axis current value can be calculated, to finally obtain the electric motor drive signal.

S8: The electric motor drive signal is sent to the electric motor controller, to control the operation of the electric motor. In response to the electric motor drive signal, the electric motor controller controls a power switching device to be on or off, to control the operation of the electric motor, so as to meet the heat generation adjustment demand of the electric drive system. The electric motor controller can also adjust the operating power of the electric motor, to adjust the heat generated by the electric drive system, for use by other modules in the vehicle.

In the control method for an electric drive system of a vehicle according to the embodiment of the present disclosure, the shaft torque of the electric motor, the present operating point of the vehicle, and the three-phase current value and the position value of the electric motor are acquired to acquire the target direct axis current value and the target quadrature axis current value, and the shaft torque of the electric motor of the vehicle is ensured to be unchanged when the vehicle travels. The target direct axis current value is controlled to oscillate at a preset change frequency and the current adjustment amplitude, to accelerate the heat generation rate of the power battery itself. Accordingly, the electric drive system of the vehicle is suitable for use in cold areas, and the heat generated by the power battery itself and the heat of the electric drive system are also applicable to the thermal management of the vehicle. Moreover, the control method for an electric drive system of a vehicle only requires the improvement of the software with no need to change the hardware architecture, has low cost, and is easy to be popularized. The heat of the electric drive system includes heat generated by the electric motor itself and heat generated by the power switching device of the electric motor controller.

In some embodiments of the present disclosure, the step of acquiring a present heat generation power of the electric drive system according to the present operating point of the vehicle can be acquiring the present heat generation power by a look-up table method according to the variation of a synthetic current vector of the electric motor of the current vehicle at different rotational speeds. The table can be obtained by calibration on a bench in advance according to the electric drive system, so as to reduce the calculation time needed in the practical control process.

In some embodiments of the present disclosure, the electric motor is, for example, a three-phase permanent magnet synchronous motor. The target direct axis current value and the target quadrature axis current value satisfy Formula (1-1). For other type of electric motors, a torque formula corresponding to the electric motor can be configured.

In the formula, $T_e$ is the shaft torque of the electric motor, in Nm; $N_P$ is the number of pole pairs in the rotor of the electric motor; $L_d$ is the direct axis inductance, in uH; $L_q$ is the quadrature axis inductance, in uH; $i_d$ is the target direct axis current value, in A; $\varphi_f$ is the magnetic flux linkage, in Vs; and $i_q$ is the target quadrature axis current value, in A.

$$T_e = 1.5 N_P[(L_d - L_q)i_d + \varphi_f]i_q \qquad \text{Formula (1-1)}$$

In some embodiments of the present disclosure, in the heat generation demand adjustment of the electric drive system, the target direct axis current value $i_d$ is controlled to oscillate. When the target direct axis current value $i_d$ is adjusted to change, the target quadrature axis current value $i_q$ also change. To ensure the normal driving of the vehicle, the target quadrature axis current value $i_q$ corresponding to the target direct axis current value $i_d$ is acquired. The target quadrature axis current value $i_q$ is defined by the algorithm of Formula (1-1), with no need to acquire it by the table look-up method. When the vehicle travels under the same conditions, the shaft torque of the electric motor $T_e$ is unchanged. When it is determined that there is a need to enter the heat generation adjustment function of the electric drive system, the target quadrature axis current value $i_q$ can be calculated according to the target direct axis current value $i_d$, and the quadrature and direct axis currents are controlled to oscillate at a preset change frequency f and the current adjustment amplitude Δd, to meet the normal driving of the vehicle.

Figure 4:
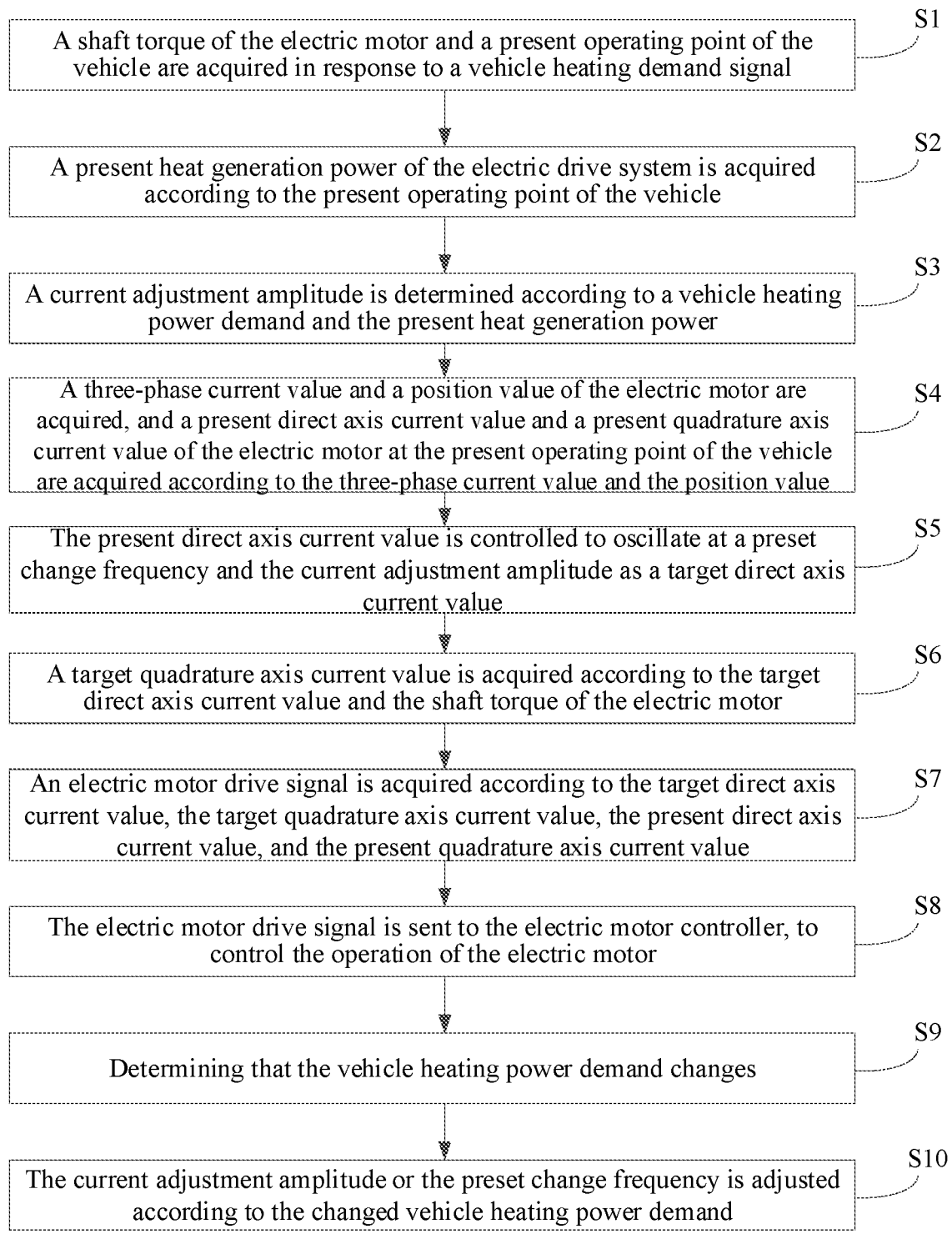
FIG. 4 is a flow chart of a control method for an electric drive system of a vehicle according to another embodiment of the present disclosure.

FIG. 4 is a flow chart of a control method for an electric drive system of a vehicle according to another embodiment of the present disclosure. In some embodiments of the present disclosure, the control method for an electric drive system of a vehicle further furthers Steps S9 and S10, which are specifically:

S9: It is determined that the vehicle heating power demand changes.

For example, after the vehicle operates for a period of time, the temperature of the vehicle power battery needs to be adjusted, and the vehicle heating power demand changes, so the heat generation adjustment function of the electric drive system needs to be adaptively adjusted. In an embodiment, the heating demands of other modules in the vehicle changes, and the heat generation adjustment function of the electric drive system needs to be adjusted to adapt to the vehicle heating power demand. For example, when a heating operation of the air conditioning system by the user is detected, or the instruction to heat the vehicle passenger compartment is received, for example, the seats, the vehicle sends a corresponding vehicle heating demand signal to the electric drive system.

S10: The current adjustment amplitude or the preset change frequency is adjusted according to the changed vehicle heating power demand.

In the embodiment of the present disclosure, when it is determined that the vehicle heating power demand changes, the current adjustment amplitude Δd is determined according to the vehicle heating power demand and the present heat generation power, and the current adjustment amplitude Δd or the preset change frequency f is adjusted to meet the vehicle heating power demand. For example, when the heat generation adjustment demand of the electric drive system increases, the current adjustment amplitude Δd needs to be increased. When the heat generation adjustment demand of the electric drive system decreases, the current adjustment amplitude Δd needs to be reduced.

Referring to FIG. 2 and FIG. 3, for example, when the vehicle operates at operating point A and the electric drive system has an increased heat generation demand, the current adjustment amplitude Δd is adjusted to increase, and the combination of the target quadrature and direct axis currents is accordingly adjusted. For example, the adjusted preset change frequency is determined to be f in Hz according to a pre-calibrated table or by real-time calculation by a relevant algorithm, and the adjusted current adjustment amplitude is determined to be Δd1 in A. Correspondingly, in FIG. 2, the trajectory of the combination of quadrature and direct axis currents is the trajectory A→D→A→E→A on torque curve 3. Correspondingly, in FIG. 3, the target direct axis current value is shifted from the direct axis current oscillating curve M to the direct axis current oscillating curve N, and the oscillating trajectory of the target direct axis current value runs along the direct axis current oscillating curve N.

The current adjustment amplitude Δd1 is a target direct axis current difference from operating point A to operating point D, or from operating point A1 to operating point E, and the target direct axis current difference from operating point A to operating point D is the same as the target direct axis current difference from operating point A1 to operating point E.

In an embodiment, in FIG. 2, the operating point is shifted from operating point A to operating point D along torque curve 3 in a direction with increasing target direct axis current value and increasing target quadrature axis current value. Simultaneously, the target direct axis current value in FIG. 3 is shifted from point A to point D along the direct axis current oscillating curve N. In this case, the target direct axis current value increases, and the target quadrature axis current value increases correspondingly. The operating point is shifted continuously, along torque curve 3 from operating point D back to operating point A in a direction with decreasing target direct axis current value and decreasing target quadrature axis current value, as shown in FIG. 2. Simultaneously, the target direct axis current value in FIG. 3 is shifted from point D to point A1 along the direct axis current oscillating curve N. In this case, the target direct axis current value decreases, and the target quadrature axis current value decreases correspondingly. The operating point is shifted continuously, along torque curve 3 from operating point A to operating point E in a direction with decreasing target direct axis current value and decreasing target quadrature axis current value, as shown in FIG. 2. Simultaneously, the direct axis current value in FIG. 3 is shifted from point A1 to point E along the direct axis current oscillating curve N. In this case, the target direct axis current value decreases, and the target quadrature axis current value decreases correspondingly. The operating point is shifted continuously, along torque curve 3 from operating point E back to operating point A in a direction with increasing target direct axis current value and increasing target quadrature axis current value, as shown in FIG. 2. Simultaneously, the target direct axis current value in FIG. 3 is shifted from point E to point A2 along the direct axis current oscillating curve N. In this case, the target direct axis current value increases, and the target quadrature axis current value increases correspondingly. As such, one oscillation period of the target direct axis current value at operating point A is completed. If the vehicle continues to operate at operating point A shown in FIG. 2, the above steps are repeated.

Figure 5:
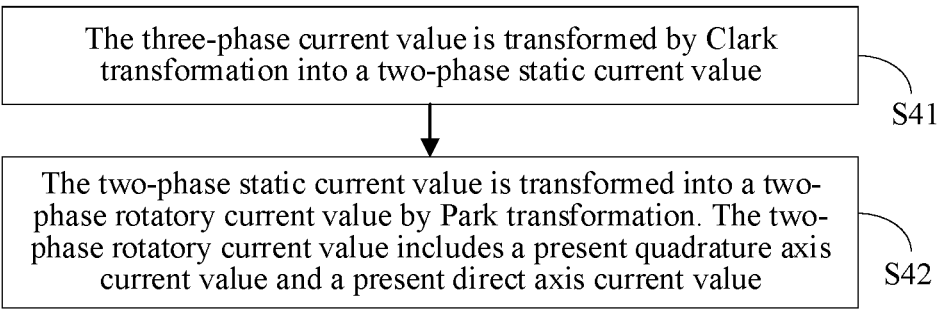
FIG. 5 is a flow chart of a control method for an electric drive system of a vehicle according to another embodiment of the present disclosure.

FIG. 5 is a flow chart of a control method for an electric drive system of a vehicle according to another embodiment of the present disclosure. In some embodiments of the present disclosure, in Step S4 above, the step of acquiring a present direct axis current value and a present quadrature axis current value of the electric motor at the present operating point of the vehicle according to the three-phase current value and the position value includes Steps S41 and S42, which are as following.

S41: The three-phase current value is transformed by Clark transformation into a two-phase static current value.

Clark transformation is a coordinate transformation method, which is used to transform a three-phase static variable into a two-phase static variable. A three-phase current value can be transformed into a two-phase static current value by Clark transformation.

S42: The two-phase static current value is transformed into a two-phase rotatory current value by Park transformation. The two-phase rotatory current value includes a present quadrature axis current value and a present direct axis current value.

Park transformation is a coordinate transformation method, which is used to transform a two-phase static variable into a two-phase spinning variable. A two-phase static current value can be transformed into a two-phase rotatory current value by Park transformation. The two-phase rotatory current value includes a present quadrature axis current value and a present direct axis current value.

Figure 6:
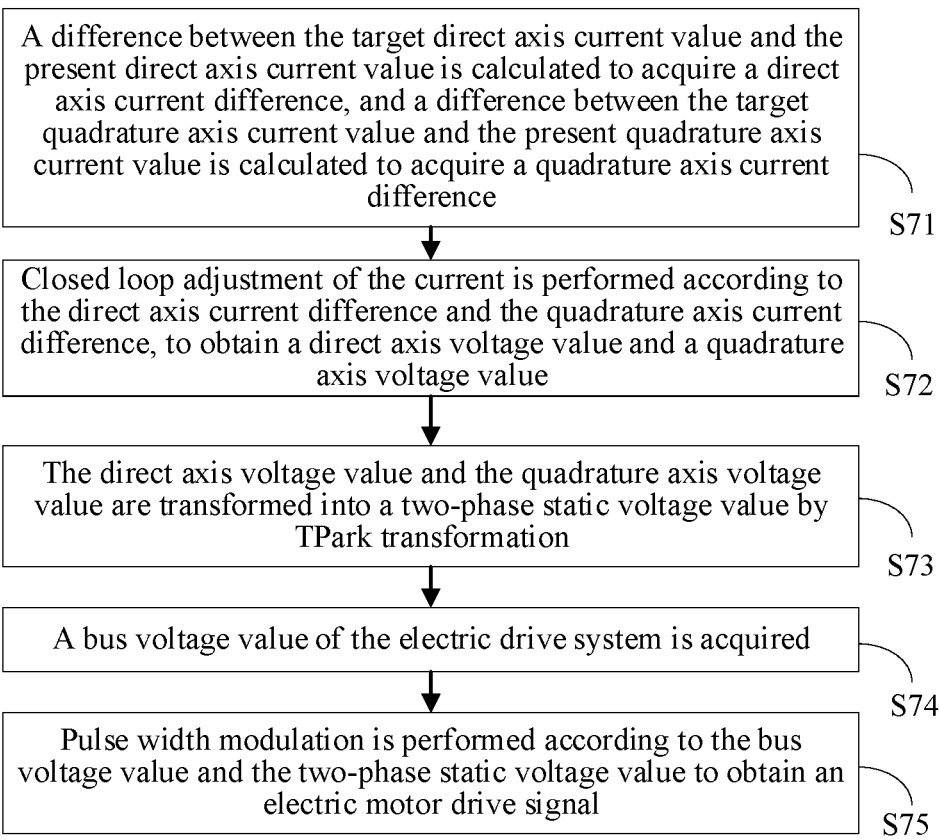
FIG. 6 is a flow chart of a control method for an electric drive system of a vehicle according to another embodiment of the present disclosure.

FIG. 6 is a flow chart of a control method for an electric drive system of a vehicle according to another embodiment of the present disclosure. In Step S7, the step of acquiring an electric motor drive signal according to the target direct axis current value, the target quadrature axis current value, the present direct axis current value, and the present quadrature axis current value includes Steps S71-S75, which are as following.

S71: A difference between the target direct axis current value and the present direct axis current value is calculated to acquire a direct axis current difference, and a difference between the target quadrature axis current value and the present quadrature axis current value is calculated to acquire a quadrature axis current difference.

In some embodiments of the present disclosure, when the target direct axis current and the target quadrature axis current value vary at a current adjustment amplitude or a preset change frequency, the outputted target direct axis current and target quadrature axis current value are variables. The time interval of acquiring the target direct axis current and the target quadrature axis current value can be set as desired, to ensure the effective operation of the system, and ensure the dynamic adjustable heat generation of the electric drive system, so as to rapidly raise the temperature of the on-board power battery and other components in the vehicle.

S72: Closed loop adjustment of the current is performed according to the direct axis current difference and the quadrature axis current difference, to obtain a direct axis voltage value and a quadrature axis voltage value.

When closed loop adjustment of current is performed on the direct axis current difference and the quadrature axis current difference, proportional integral (PI) control and feed-forward decoupling can be used, to obtain a direct axis voltage value and a quadrature axis voltage value.

S73: The direct axis voltage value and the quadrature axis voltage value are transformed into a two-phase static voltage value by TPark transformation.

TPark transformation is a coordinate transformation method, which is used to transform a two-phase rotatory variable into a two-phase static variable. A two-phase rotatory voltage value is transformed into a two-phase static voltage value by TPark transformation.

S74: A bus voltage value of the electric drive system is acquired, where the bus voltage value at an DC end of an electronic controller of the system is acquired by the electric motor controller when the shaft torque of the electric motor, the present operating point of the vehicle, the three-phase current value and the position value of the electric motor are acquired and calculated.

S75: Pulse width modulation is performed according to the bus voltage value and the two-phase static voltage value to obtain an electric motor drive signal.

In an embodiment of the present disclosure, the bus voltage value and the two-phase static voltage value are delivered to and modulated by a module having pulse width modulation function, to acquire an electric motor drive signal, which is sent to the electric motor controller. The electric motor drive signal can be an on/off signal, to control the power switching device to be switched on or off. In this way, the operation of the electric motor is controlled, and the heat generated by the electric drive system can also be adjusted, to provide heat energy for other components of the vehicle, thereby meeting the heat generation adjustment demand of the electric drive system.

In some embodiments, the electric motor controller includes a power switching device. When the target direct axis current value is greater than a limit value, the carrier frequency of the power switching device fluctuates in a preset range.

Figure 9:
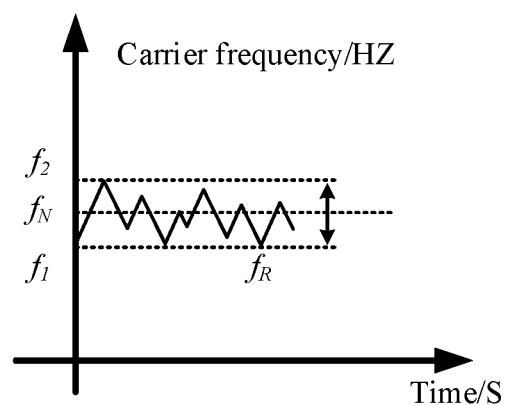
FIG. 9 is a schematic diagram showing the variation of carrier frequency according to an embodiment of the present disclosure.

The present inventor finds that when the direct axis current is greater than a limit value, the magnetic strength between the stator and rotor is high. When the carrier frequency is constant, the electric motor has concentrated harmonic voltage and harmonic current at the carrier frequency $f_N$ and frequencies which are integer multiples of the carrier frequency, whereby the generated electromagnetic interference and high-frequency noise become more prominent under the heating demand. As shown in FIG. 9, it can be understood that the power switching device is switched on or off according to the electric motor drive signal, the time from a previous switching on to a next switching on of the power switching device is a period, and the carrier frequency is the reciprocal of the period. The preset range is 90% of the current carrier frequency to 110% of the current carrier frequency. Using this carrier frequency control strategy, the harmonic voltage can be effectively distributed to a wider scope of spectrum, to reduce the vibration of the electric motor and noise, and optimize the NVH performance of the vehicle.

Figure 7:
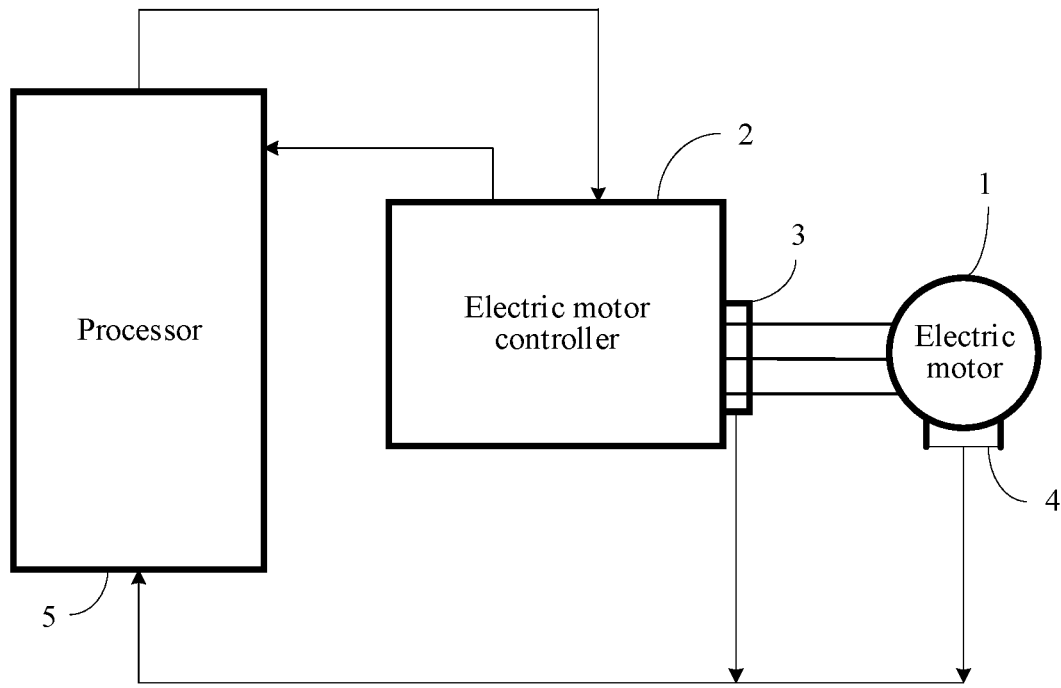
FIG. 7 is a block diagram of an electric drive system according to an embodiment of the present disclosure.

FIG. 7 is a block diagram of an electric drive system according to an embodiment of the present disclosure.

In some embodiments of the present disclosure, an electric drive system 10 includes an electric motor 1, an electric motor controller 2, a current sensor 3, a position sensor 4 and a processor 5, as shown in FIG. 7.

When operates, the electric motor 1 can provides heat energy to the power battery and other components of the vehicle. The electric motor controller 2 can control the operation state of the electric motor 1 according to the electric motor drive signal. For example, the electric motor controller 2 can control the operation of the electric motor by controlling the on or off of the power switching device. The current sensor 3 can be provided between the electric motor 1 and the electric motor controller 2, and configured to collect a three-phase current value of the electric motor 1. The position sensor 4 is configured to collect a position value of the electric motor 1, where the position value may include the real-time rotor position and rotational speed of the electric motor.

The processor 5 is respectively connected to the electric motor controller 2, the current sensor 3 and the position sensor 4, and configured to implement the control method for an electric drive system of a vehicle according to any of the foregoing embodiments.

In the electric drive system 10 according to the embodiment of the present disclosure, general-purpose electric drive system hardware can be used, and the control method for an electric drive system of a vehicle according to any of the foregoing embodiments is implemented by the processor 5, to accelerate the heat generation rate of the power battery itself. Accordingly, the electric drive system of the vehicle is suitable for use in cold areas, and the heat generated by the power battery itself is also applicable to thermal management of the vehicle. Moreover, the control method for an electric drive system of a vehicle only requires the improvement of the software with no need to change the hardware architecture, has low cost, and is easy to be popularized.

Figure 8:
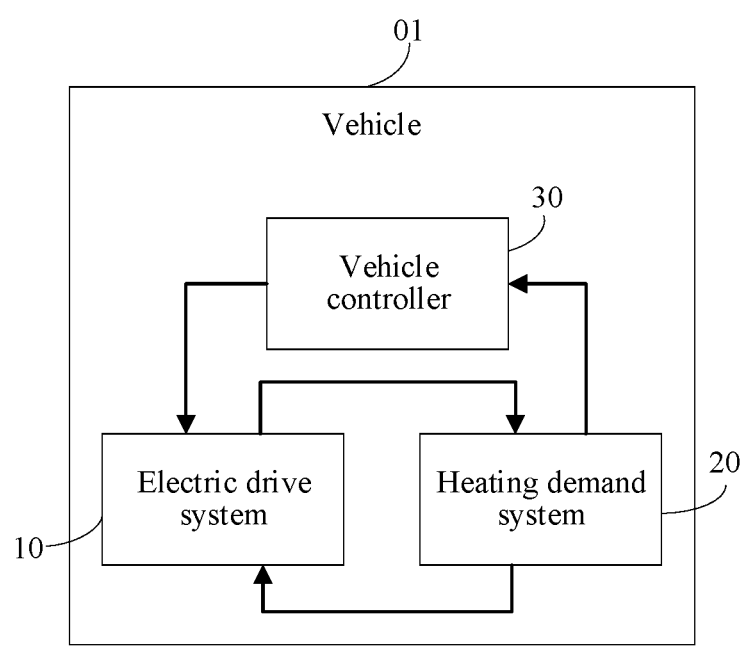
FIG. 8 is a block diagram of a vehicle according to an embodiment of the present disclosure.

FIG. 8 is a block diagram of a vehicle according to an embodiment of the present disclosure.

In some embodiments of the present disclosure, a vehicle 01 includes a heating demand system 20, a vehicle controller 30, and an electric drive system 10 according to any of the foregoing embodiments, as shown in FIG. 8.

The vehicle controller 30 is configured to send a vehicle heating demand signal when the heating demand system 20 is determined to have a heating demand. The heating demand system includes multiple modules or components in the vehicle, for example, the power battery, vehicle passenger compartment, and air conditioning system in new energy vehicles. A temperature sensor can acquire a current ambient temperature and/or the temperature of a module or component in the heating demand system 20, and send a heating demand signal if it is determined that the module or component needs to be heated. In an embodiment, a user sends a heating demand signal by operating a human-machine interaction device such as a display screen or a button.

The electric drive system 10 is connected to the vehicle controller 30, and the electric drive system 10 forms a heat conducting loop with the heating demand system 20. The heat generated by the electric drive system 10 is optionally or totally conducted to other modules or the power battery in the vehicle by the heat conducting loop. The structure of the heat conducting loop is not limited herein, and the specific heat conducting flow direction can be determined according to actual situation of each module in the vehicle.

In the vehicle 01 according to the embodiment of the present disclosure, the heat conducting loop conducts modules in the vehicle 01 that may have heat demand, for example, power battery. When a heat generation demand is raised for the electric drive system 10, the vehicle controller 30 receives a heating demand signal. By the control method for an electric drive system of a vehicle according to any of the foregoing embodiments, the quadrature and direct axis current values are controlled to oscillate at the current adjustment amplitude and preset change frequency, and the electric motor controller 2 controls the electric motor 1 to operate. Therefore, the electric drive system 10 can be adjusted to generate heat dynamically at any operating point of the vehicle 01, to quickly raise the temperature of the power battery of the vehicle 01 and other components in the vehicle.

In some embodiments of the present disclosure, the heating demand system 20 includes the power battery. For example, for new energy vehicles in cold areas or in severe cold conditions, the power battery of the vehicle 01 needs to be heated, so the vehicle 01 enters the heat generation adjustment demand of the electric drive system 10. By the control method for an electric drive system of a vehicle according to any of foregoing embodiment, the electric drive system 10 is controlled to generate heat, and the heat is delivered to the power battery by the heat conducting loop, such that the heat generation rate of the power battery is increased, while the shaft torque output of the electric motor is not affected. In this way, the influence of low temperature on the charging and discharging performance of the power battery and the vehicle performance is avoided.

In some embodiments of the present disclosure, the heating demand system 20 includes the vehicle passenger compartment and the air conditioning system. For example, when a user is intended to heat the seat in the vehicle passenger compartment, or heat the vehicle by the air conditioning system, the vehicle 01 enters the heat generation adjustment demand of the electric drive system 10. By the control method for an electric drive system of a vehicle according to any of the foregoing embodiment, the electric drive system 10 is controlled to generate heat. While the vehicles is driven normally, the heat generated by the electric drive system 10 is dynamically adjusted, and the heating demand system 20 of the vehicle is rapidly heated by the heat conducting loop, to meet the user's demand.

Other configurations and operations of the vehicle 01 according to the embodiments of the present disclosure are known to those of ordinary skill in the art and will not be described in detail herein.

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of the present disclosure. In this specification, exemplary descriptions of the foregoing terms do not necessarily refer to the same embodiment or example.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A control method for an electric drive system of a vehicle, the electric drive system comprising an electric motor and an electric motor controller, the method comprising:

acquiring a shaft torque of the electric motor and a present operating point of the vehicle in response to a vehicle heating demand signal;

acquiring a present heat generation power of the electric drive system according to the present operating point of the vehicle;

determining a current adjustment amplitude according to a vehicle heating power demand and the present heat generation power;

acquiring a three-phase current value and a position value of the electric motor, and acquiring a present direct axis current value and a present quadrature axis current value of the electric motor at the present operating point of the vehicle according to the three-phase current value and the position value;

controlling the present direct axis current value to oscillate at a change frequency and the current adjustment amplitude to obtain a target direct axis current value, by:

acquiring a first direct axis current value and a second direct axis current value according to the current adjustment amplitude, wherein the target direct axis current value changes periodically at the change frequency with the present direct axis current value as a reference value, the first direct axis current value as a peak, and the second direct axis current value as a valley, the first direct axis current value is a sum of the present direct axis current value and the current adjustment amplitude, and the second direct axis current value is a difference of the present direct axis current value and the current adjustment amplitude;

acquiring a target quadrature axis current value according to the target direct axis current value and the shaft torque of the electric motor;

acquiring an electric motor drive signal according to the target direct axis current value, the target quadrature axis current value, the present direct axis current value, and the present quadrature axis current value; and sending the electric motor drive signal to the electric motor controller, to control an operation of the electric motor.

2. The control method according to claim 1, wherein the determining the current adjustment amplitude according to the vehicle heating power demand and the present heat generation power comprises:

calculating a power difference between the heating power demand of the vehicle and the present heat generation power; and acquiring the current adjustment amplitude according to the power difference, wherein the current adjustment amplitude increases as the power difference increases.

3. The control method according to claim 1, wherein the electric motor controller comprises a power switching device; and when the target direct axis current value is greater than a limit value, a carrier frequency of the power switching device fluctuates randomly in a range.

4. The control method according to claim 1, wherein the target direct axis current value and the target quadrature axis current value meet:

$$T_e = 1.5 N_p[(L_d - L_q)i_d + \varphi_f]i_q;$$

wherein $T_e$ is the shaft torque of the electric motor, $N_p$ is a number of pole pairs in a rotor of the electric motor, $L_d$ is a direct axis inductance, $L_q$ is a quadrature axis inductance, $i_d$ is the target direct axis current value, $\varphi_f$ is a magnetic flux linkage, and $i_q$ is the target quadrature axis current value.

5. The control method according to claim 1, further comprising:

determining that the vehicle heating power demand changes; and adjusting the current adjustment amplitude or the change frequency according to the changed vehicle heating power demand.

6. The control method according to claim 1, wherein the acquiring the present direct axis current value and the present quadrature axis current value of the electric motor at the present operating point of the vehicle according to the three-phase current value and the position value comprises:

transforming the three-phase current value into a two-phase static current value; and transforming the two-phase static current value into a two-phase rotatory current value, wherein the two-phase rotatory current value comprises the present quadrature axis current value and the present direct axis current value.

7. The control method according to claim 1, wherein the acquiring the electric motor drive signal according to the target direct axis current value, the target quadrature axis current value, the present direct axis current value, and the present quadrature axis current value comprises:

acquiring a direct axis current difference by calculating a difference between the target direct axis current value and the present direct axis current value, and acquiring a quadrature axis current difference by calculating a difference between the target quadrature axis current value and the present quadrature axis current value;

obtaining a direct axis voltage value and a quadrature axis voltage value by performing closed loop current adjustment according to the direct axis current difference and the quadrature axis current difference;

transforming the direct axis voltage value and the quadrature axis voltage value into a two-phase static voltage value;

acquiring a bus voltage value of the electric drive system; and obtaining the electric motor drive signal by performing pulse width modulation according to the bus voltage value and the two-phase static voltage value.

8. An electric drive system, comprising:
an electric motor and an electric motor controller;
a current sensor, configured to collect a three-phase current value of the electric motor;
a position sensor, configured to collect a position value of the electric motor; and
a processor, connected to the electric motor controller, the current sensor, and the position sensor, and configured to perform operations comprising:
acquiring a shaft torque of the electric motor and a present operating point of a vehicle in response to a vehicle heating demand signal;
acquiring a present heat generation power of the electric drive system according to the present operating point of the vehicle;
determining a current adjustment amplitude according to a vehicle heating power demand and the present heat generation power;
acquiring a three-phase current value and a position value of the electric motor, and acquiring a present direct axis current value and a present quadrature axis current value of the electric motor at the present operating point of the vehicle according to the three-phase current value and the position value;
controlling the present direct axis current value to oscillate at a change frequency and the current adjustment amplitude to obtain a target direct axis current value, by:
acquiring a first direct axis current value and a second direct axis current value according to the current adjustment amplitude, wherein
the target direct axis current value changes periodically at the change frequency with the present direct axis current value as a reference value, the first direct axis current value as a peak, and the second direct axis current value as a valley,
the first direct axis current value is a sum of the present direct axis current value and the current adjustment amplitude, and
the second direct axis current value is a difference of the present direct axis current value and the current adjustment amplitude;
acquiring a target quadrature axis current value according to the target direct axis current value and the shaft torque of the electric motor;
acquiring an electric motor drive signal according to the target direct axis current value, the target quadrature axis current value, the present direct axis current value, and the present quadrature axis current value; and
sending the electric motor drive signal to the electric motor controller, to control an operation of the electric motor.

9. The electric drive system according to claim 8, wherein the determining the current adjustment amplitude according to the vehicle heating power demand and the present heat generation power comprises:
calculating a power difference between the heating power demand of the vehicle and the present heat generation power; and
acquiring the current adjustment amplitude according to the power difference, wherein the current adjustment amplitude increases as the power difference increases.

10. The electric drive system according to claim 8, wherein the electric motor controller comprises a power switching device; and when the target direct axis current value is greater than a limit value, a carrier frequency of the power switching device fluctuates randomly in a range.

11. The electric drive system according to claim 8, wherein the target direct axis current value and the target quadrature axis current value meet:

$$T_e=1.5N_p[(L_d-L_q)i_d+\varphi_f]i_q;$$

wherein $T_e$ is the shaft torque of the electric motor, $N_p$ is a number of pole pairs in a rotor of the electric motor, $L_d$ is a direct axis inductance, $L_q$ is a quadrature axis inductance, $i_d$ is the target direct axis current value, $\varphi_f$ is a magnetic flux linkage, and $i_q$ is the target quadrature axis current value.

12. The electric drive system according to claim 8, further comprising:
determining that the vehicle heating power demand changes; and
adjusting the current adjustment amplitude or the change frequency according to the changed vehicle heating power demand.

13. The electric drive system according to claim 8, wherein the acquiring the present direct axis current value and the present quadrature axis current value of the electric motor at the present operating point of the vehicle according to the three-phase current value and the position value comprises:
transforming the three-phase current value into a two-phase static current value; and
transforming the two-phase static current value into a two-phase rotatory current value, wherein the two-phase rotatory current value comprises the present quadrature axis current value and the present direct axis current value.

14. The electric drive system according to claim 8, wherein the acquiring the electric motor drive signal according to the target direct axis current value, the target quadrature axis current value, the present direct axis current value, and the present quadrature axis current value comprises:
acquiring a direct axis current difference by calculating a difference between the target direct axis current value and the present direct axis current value, and acquiring a quadrature axis current difference by calculating a difference between the target quadrature axis current value and the present quadrature axis current value;
obtaining a direct axis voltage value and a quadrature axis voltage value by performing closed loop current adjustment according to the direct axis current difference and the quadrature axis current difference;
transforming the direct axis voltage value and the quadrature axis voltage value into a two-phase static voltage value;
acquiring a bus voltage value of the electric drive system; and obtaining the electric motor drive signal by performing pulse width modulation according to the bus voltage value and the two-phase static voltage value.

15. A vehicle, comprising:
a heating demand system and a vehicle controller, wherein the vehicle controller is configured to send a vehicle heating demand signal when the heating demand system is determined to have a heating demand; and
an electric drive system, connected to the vehicle controller, and forming a heat conducting loop with the heating demand system, wherein the electric drive system, comprises:
an electric motor and an electric motor controller;
a current sensor, configured to collect a three-phase current value of the electric motor;
a position sensor, configured to collect a position value of the electric motor; and
a processor, connected to the electric motor controller, the current sensor, and the position sensor, and configured to perform operations comprising:
acquiring a shaft torque of the electric motor and a present operating point of the vehicle in response to a vehicle heating demand signal;
acquiring a present heat generation power of the electric drive system according to the present operating point of the vehicle;
determining a current adjustment amplitude according to a vehicle heating power demand and the present heat generation power;
acquiring a three-phase current value and a position value of the electric motor, and acquiring a present direct axis current value and a present quadrature axis current value of the electric motor at the present operating point of the vehicle according to the three-phase current value and the position value;
controlling the present direct axis current value to oscillate at a change frequency and the current adjustment amplitude to obtain a target direct axis current value, by:
acquiring a first direct axis current value and a second direct axis current value according to the current adjustment amplitude, wherein
the target direct axis current value changes periodically at the change frequency with the present direct axis current value as a reference value, the first direct axis current value as a peak, and the second direct axis current value as a valley,
the first direct axis current value is a sum of the present direct axis current value and the current adjustment amplitude, and
the second direct axis current value is a difference of the present direct axis current value and the current adjustment amplitude;
acquiring a target quadrature axis current value according to the target direct axis current value and the shaft torque of the electric motor;
acquiring an electric motor drive signal according to the target direct axis current value, the target quadrature axis current value, the present direct axis current value, and the present quadrature axis current value; and
sending the electric motor drive signal to the electric motor controller, to control an operation of the electric motor.

16. The vehicle according to claim 15, wherein the heating demand system comprises a power battery.

17. The vehicle according to claim 15, wherein the heating demand system comprises a vehicle passenger compartment and an air conditioning system.

* * * * *